United States Patent
Levine et al.

(10) Patent No.: US 6,640,221 B1
(45) Date of Patent: Oct. 28, 2003

(54) SYSTEM AND METHOD FOR CONFIGURING, SEQUENCING AND VIEWING JOINS IN A QUERY

(75) Inventors: Fred Levine, Durham, NC (US); Steven Giles, Raleigh, NC (US); John Forrest Boozer, Cary, NC (US)

(73) Assignee: SAS Institute Inc., Cary, NC (US)

( * ) Notice: Subject to any disclaimer, the term of this patent is extended or adjusted under 35 U.S.C. 154(b) by 265 days.

(21) Appl. No.: 09/613,348

(22) Filed: Jul. 10, 2000

(51) Int. Cl.[7] .............................................. G06F 17/30
(52) U.S. Cl. ................................................. 707/3; 707/5
(58) Field of Search ................................ 707/3, 2, 1, 4, 707/5, 6, 101, 104

(56) References Cited

U.S. PATENT DOCUMENTS

| | | |
|---|---|---|
| 4,497,039 A | 1/1985 | Kitakami et al. |
| 4,811,207 A | 3/1989 | Hikita et al. |
| 5,121,494 A | 6/1992 | Dias et al. |
| 5,241,648 A | 8/1993 | Cheng et al. |
| 5,553,218 A | 9/1996 | Li et al. |
| 5,557,791 A | 9/1996 | Cheng et al. |
| 5,680,603 A | 10/1997 | Bhargava et al. |
| 5,721,900 A | 2/1998 | Banning et al. |
| 5,721,901 A | 2/1998 | Banning et al. |
| 5,802,357 A | 9/1998 | Li et al. |
| 5,842,209 A | 11/1998 | Mocek et al. |
| 5,983,215 A | 11/1999 | Ross et al. |
| 6,105,020 A * | 8/2000 | Lindsay et al. ................. 707/2 |
| 6,167,399 A * | 12/2000 | Hoang ............................ 707/2 |
| 6,356,896 B1 * | 3/2002 | Cheng et al. ................. 345/440 |
| 6,374,235 B1 * | 4/2002 | Chen et al. ..................... 707/2 |
| 6,385,603 B1 * | 5/2002 | Chen et al. ..................... 707/2 |
| 6,397,204 B1 * | 5/2002 | Liu et al. ........................ 707/2 |
| 6,421,663 B1 * | 7/2002 | Chen et al. ..................... 707/3 |

* cited by examiner

*Primary Examiner*—Sanjiv Shah
(74) *Attorney, Agent, or Firm*—Jones Day (57) ABSTRACT

A system and method for configuring, sequencing and viewing joins in a query is provided. The system includes an advanced joins viewer that may be invoked from an SQL Query Tool. A graphical user interface associated with the advanced joins viewer displays a sequenced vertical tile list of each table and each intermediate result set in a particular query. Through this interface, a user may re-sequence the ordering of the tables and thus reconfigure the intermediate result sets that are generated by the query. The advanced joins viewer enables the independent configuration of the join type and the join relationships for each of the intermediate result sets. An automatic sequencing algorithm is also provided for configuring the ordering of the tables such that the query produces valid SQL.

24 Claims, 8 Drawing Sheets

SYSTEM AND METHOD FOR CONFIGURING, SEQUENCING AND VIEWING JOINS IN A QUERY

BACKGROUND OF THE INVENTION

1. Technical Field

The present invention is directed to the field of database queries. More specifically, the invention provides a system and method for configuring, sequencing and viewing joins in a database query.

2. Description of the Related Art

In today's information economy, companies increasingly rely on information systems to remain competitive. Foremost among these information systems are database management systems that utilize relational databases. These systems are generally referred to as relational database management systems. Relational databases organize data records into a multitude of interconnected tables. Each table consists of rows and columns of data from the data records stored in the database. The rows of data are also known as tuples.

A relational database management system typically includes software for searching and retrieving data records from the relational database. The most common means for accomplishing this search and retrieval task is the Structured Query Language (SQL). SQL provides a software framework for logically structuring complex conditional expressions (i.e., relationships) for querying a database. SQL includes many different types of logical constructs, including the WHERE clause, the SELECT statement, the HAVING clause, and the ON clause. A WHERE clause is typically structured as follows: WHERE (variable 1 <operator> condition 1) link (variable 2 <operator> condition 2). The WHERE clause returns data records from the database that meet the two conditional expressions (variable 1 <operator> condition 2) link (variable 2 <operator> condition 2), depending on the type of link. Two common forms of link operators for conditional expressions are the "AND" link and the "OR" link.

The SQL ON clause typically forms part of the SQL SELECT statement, and it is used to define a set of relationships (conditional expressions) that are associated with joining two or more tables. In SQL syntax, a join may be defined as a relational operation that allows a program to retrieve data from two or more tables based on matching column values. *IBM Dictionary of Computing*, 10th Edition, p. 365. The SQL join operation combines the data rows (or tuples) from two or more tables into a result set according to the relationships expressed in the ON clause, and also according to the type of join. The result set is a data table that includes the merged data rows from the two or more tables operated on by the join that meet the relationships set in the ON clause.

In an SQL statement that includes more than one join operation, there are two types of result sets, a final result set and one or more intermediate result sets. The final result set is the final table that is generated from the tables being joined after all the join operations are executed. The intermediate result set is the intermediate table that is generated from just two of the tables (or one table and another intermediate result set) being joined in one of the join operations. As discussed below, certain types of joins, such as the outer join, internally produce intermediate result sets.

A generic SQL statement for generating a result set from a join operation may be expressed as follows:

SELECT [Cols] from [Table 1] join type [Table 2] ON {CONDITION =<relationship 1 > operator <relationship 2> operator <relationship N> }.

Here, Table 1 and Table 2 are the two tables operated on by the join. There are several different types of join that can be used to merge data from tables. The most common join types include the inner join, the left outer join, the right outer join, and the full outer join.

The condition of the ON clause includes one or more relationships coupled together by one or more operators. For example, relationship 1 could be "Table1.column1 =Table2.column1" and relationship 2 could be "Table1.column2 =Table2.column2." The operator that couples relationship 1 to relationship 2 could be the AND operator, or it could be some other type of logical operator. In this example, the condition of the join is met when the data entry in the first column of the first table is equal to the data entry in the first column of the second table and where the data entry in the second column of the first table is equal to the data entry in the second column of the second table.

An inner join of two tables returns only the rows in each table that meet the condition in the ON clause—i.e., the matching rows. In the left, right and full outer joins, however, rows in one of the tables may be returned into the result set even though there are no matching rows in the other table (or intermediate result set). In a left outer join the left table is preserved, meaning that all of the matching and non-matching rows from the left table are returned into the result set. For the right table in the left outer join, only the matching rows are returned, similar to the inner join. Likewise, in a right outer join the right table is preserved, so that all of the matching and non-matching rows from the right table are returned into the result set and only the matching rows from the left table are returned. The syntax left versus right in a join operation is determined by the placement of the table in the SQL statement. In the example above, Table1 is the left table and Table2 is the right table. A full outer join combines the rows that are returned from both a left and a right outer join.

Graphical interfaces for visually depicting tables and their relationships are known in this field. These graphical interfaces generally depict the tables as boxes. The boxes may include the title of the table and a listing of the various column variables. Relationships between the tables are then depicted as lines that connect a column variable in one table to a column variable in another table. Numerous relationships may be depicted between the tables, and thus there is often more than one line connecting the tables together. In order to set the join type between two tables, a user typically selects one of the column relationships (i.e., picks a line that connects the tables) and then sets the joint type based on the selected relationship.

In a query tool that only permits inner joins, these known interfaces provide some utility. In a tool that enables more complex join operations, however, such as the various forms of outer joins discussed above, these known interfaces suffer from two significant problems. The first problem relates to the ambiguity created when there is more than one relationship between the tables and the user selects one of the relationships and sets the join type to an outer join. The problem here is how to configure the other non-selected relationship(s) that connect the two tables. One way to configure these other relationships is to assume that they represent AND conditions to the relationship that was set to an outer join. But another way is to configure these other relationships as separate joins. This outer join ambiguity problem inherently results from setting the join type based upon one of the column relationships.

The second problem with these known interfaces and tools relates to properly sequencing the order in which the tables are joined. Like the first problem, this second problem does not typically apply to a tool that only permits inner joins. For the more complex tool, however, which permits various forms of outer joins, the issue of proper table sequence is important. The final result set of a query may change depending upon the order (sequence) of the tables in the generated SQL when there are one or more outer joins. This occurs because the outer join operation internally produces an intermediate result set, which is then joined with subsequent tables in the join. Thus, changing the sequencing of the tables can change the query results when outer joins are involved. Known query tools and interfaces do not address this problem in any significant manner. Instead, these tools simply assume that the user has ordered the tables properly when the tables are selected during the process of building the query. This assumption, however, is often incorrect, and can lead to improper query results.

SUMMARY OF THE INVENTION

A system and method for configuring, sequencing and viewing joins in a query is provided. The system includes an advanced joins viewer that may be invoked from an SQL Query Tool. A graphical user interface associated with the advanced joins viewer displays a sequenced vertical tile list of each table and each intermediate result set in a particular query.

Through this interface, a user may re-sequence the ordering of the tables and thus reconfigure the intermediate result sets that are generated by the query. The advanced joins viewer enables the independent configuration of the join type and the join relationships for each of the intermediate result sets. An automatic sequencing algorithm is also provided for configuring the ordering of the tables such that the query produces valid SQL.

According to one aspect of the invention, a system for configuring, sequencing and displaying joins in a query is provided. The system is software based, and includes a sequence display window for depicting the sequence in which a plurality of tables are joined in the query, and for selecting an intermediate result set comprising two or more of the depicted tables; and a join configuration and display window for displaying the selected intermediate result set, including a table display for depicting the tables associated with the intermediate result set, a join type selector for configuring the type of join for the intermediate result set, and a relationships display window for depicting one or more relationships between the tables in the intermediate result set.

According to another aspect of the invention, a software tool is provided for creating SQL queries. The software tool includes a graphical user interface for selecting tables and for defining relationships between the tables, and an advanced joins viewer for depicting one or more intermediate result sets comprising two or more of the selected tables, and for configuring the joins between the tables independently of any defined relationships.

Still another aspect of the invention provides a method of configuring joins in an SQL query, comprising the steps of: (a) adding two or more tables to the query; (b) setting column relationships between the two or more tables; (c) selecting an intermediate result set from the two or more tables added to the query; (d) displaying the join type and column relationships for the selected intermediate result set; and (e) configuring the join type for the intermediate result set independently of the column relationships.

Another aspect of the invention provides a method of configuring joins in a database management system, comprising the steps of: (i) selecting a plurality of tables from a relational database; (ii) setting a plurality of relationships between the plurality of tables; (iii) displaying a sequenced listing of the selected tables; (iv) selecting an intermediate result set comprising two or more of the selected tables; (v) displaying a plurality of join types for the intermediate result set; and (vi) selecting a join type for the intermediate result set independently from the plurality of relationships.

Yet another aspect of the invention provides a method of automatically sequencing tables joined in an SQL query, comprising the steps of: (a) providing a join object for each table, wherein the join object includes a table relationships list that sets forth related tables; (b) providing a first list of the tables in the SQL query; (c) moving a first table from the first list into a second list and deleting the first table from the first list; (d) determining whether the first table has a related table in its table relationships list, and, if so, then moving the related table from the first list to the second list and deleting the related table from the first list; (e) repeating step (d) until a selected table has no related table in its table relationships list; (f) fetching a second table from the first list; (g) determining whether the second table has a related table in its table relationships list that has been moved to the second list, and, if so, then moving the related table from the first list to the second list and deleting the related table from the first list; and (h) repeating steps (d) through (g) until there are no tables remaining in the first list.

Another aspect of the invention provides a computer-implemented process for sequencing and configuring joins in an SQL query, comprising the steps of: (i) graphically building an SQL query having a plurality of tables, wherein the tables are related by a plurality of table relationships; (ii) automatically sequencing the tables in order to generate a valid SQL query; (iii) graphically depicting the sequencing of the tables as a plurality of intermediate result sets; (iv) selecting one of the intermediate result sets; and (v) configuring the join type for the selected intermediate result set independently from the plurality of table relationships.

Still another aspect of the invention provides a method of visually depicting and modifying the sequence of joins in a query, comprising the steps of: (a) generating a sequence display window comprising a plurality of tiles, wherein each tile corresponds to a table in the query that is joined to some other table; (b) ordering the tiles in a particular sequence; (c) selecting one of the tiles to be re-ordered in the sequence; (d) graphically moving the selected tile from a first position in the sequence to a second position in the sequence; and (e) re-ordering the tiles so that the selected tile is depicted in the second position in the sequence.

It should be noted that these are just some of the many aspects of the present invention. Other aspects not specified will become apparent upon reading the detailed description of the preferred embodiment set forth below.

DETAILED DESCRIPTION OF THE DRAWINGS

Figure 1:
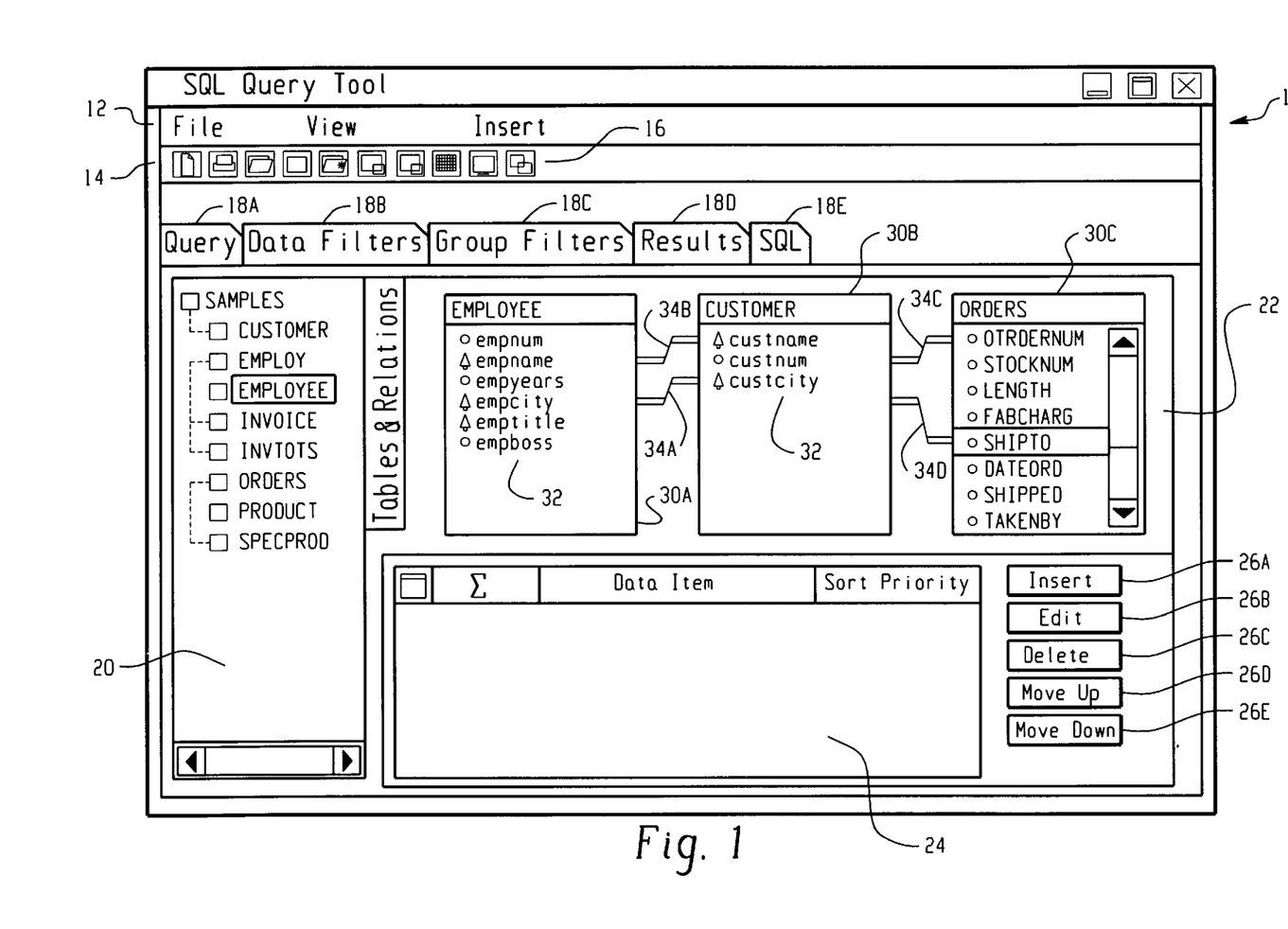
FIG. 1 is a graphical user interface of an SQL Query Tool for creating and manipulating SQL queries.

Turning now to the drawings, FIG. 1 sets forth a graphical user interface 10 of an SQL Query Tool 10 for creating and manipulating SQL queries. The SQL Query Tool 10 is preferably implemented as a software program that is part of a comprehensive data mining application for use in data analysis and search and retrieval operations on a relational database. An example of such a data mining application is Enterprise Miner, which is available from SAS Institute, of Cary, N.C. Alternatively, however, the SQL Query Tool 10 may be a stand-alone software application, a downloadable applet, or some other form of software-based application. This software may be embodied in a tangible medium, or product, such as a magnetic medium, or an optical medium such as a CD-ROM.

Several graphical user interface elements are included in the preferred SQL Query Tool 10, such as a menu bar 12, an icon bar 14, a plurality of SQL operator tabs 18A–18E, a table selection window 20, a tables and relations window 22, and a data item editing window 24. The menu bar 12 and the icon bar 14 (which are also referred to as toolbars) are well-known graphical elements in the field of windows interfaces. The menu bar 12 provides a hierarchical drop-down list of the features and functions of the Tool 10. The icon bar 14 is similar in nature to the menu bar 12, except that instead of a hierarchical drop-down list, the icon bar 14 displays an icon associated with commonly-used features and functions of the Tool 10. One of the functions of the SQL Query Tool 10 that is preferably represented in both the menu bar 12 and the icon bar is the advanced joins viewer (described in more detail below.) The advanced joins viewer icon selection is shown as icon 16.

The remaining graphical elements shown in FIG. 1 are more specific to the functionality of the SQL Query Tool 10. Displayed just below the icon bar 16 is a set of Query Operation tabs, including a query tab 18A, a data filters tab 188B, a group filters tab 18C, a results tab 18D, and an SQL tab 18E. Together, these tabs provide a set of functions for creating and manipulating SQL queries. The query tab 18A is selected in FIG. 1, and displays the additional windows 20, 22, 24 for visually building an SQL statement by forming relationships between a plurality of tables from the relational database. The data filters tab 18B is used to build a graphical representation of a data filter query using the SQL WHERE clause, as described in more detail in co-pending patent application Ser. No. 09/585,079, U.S. Pat. No. 6,470,335 entitled "System and Method for Optimizing the Structure and Display of Complex Data Filters, " the disclosure of which is hereby incorporated into this application by reference. The group filters tab 18C is used to build a data filter using the SQL HAVING clause. The results tab 18D displays the final result set that is returned from the relational database in response to the query. And the SQL tab 18E is selected in order to automatically generate the textual SQL query based on the visual representations constructed using the query, data filters and group filters tabs 18A, 18B, and 18C.

The query tab 18A displays several windows 20, 22, 24 for visually building an SQL SELECT statement, including a table selection window 20, a tables and relations window 22, and a relationship editing window 24. (Although the term "window" is used to describe these graphical elements, one of ordinary skill in the art would understand that these "windows" would not necessarily take up the entire display screen and could alternatively be termed "subwindows," "frames," or "panes.") In the table selection window 20, a hierarchical display of the tables included in a particular relational database is set forth. For example, in FIG. 1, a database named "SAMPLES" is shown, which includes several tables, such as a "CUSTOMER" table, an "EMPLOYEE" table, and an "ORDERS" table, as well as many other tables. A user of the Query Tool 10 can add a table to the SQL SELECT statement under construction by selecting the name of the table, such as EMPLOYEE, from the table selection window 20. This selection step is typically accomplished by "clicking" the text "EMPLOYEE" in the selection window 20 using a pointer device, such as a mouse.

When the user "clicks" the EMPLOYEE entry in the window 20, a corresponding box 30A is displayed in the tables and relations window 22 that depicts the selected table. The depiction of the selected table 30A includes a title, such as EMPLOYEE, and also includes the column names 32 that comprise the table. By selecting several tables 30A, 30B, 30C, the user of the tool 10 can create a complex SELECT statement including multiple tables.

Having selected the tables 30A, 30B, 30C using the window 20, the user then adds relationships 34A, 34B, 34C, 34D between the tables using the tables and relations window 22.

Here, the user sets a relationship by connecting a column in one table with a column in another table. This relationship setting step is preferably accomplished by selecting (or "clicking") on one of the columns in one of the tables and "dragging" that column on top of a column in another table using the pointing device. Alternatively, the relationship setting step may be accomplished through a menu bar 12 selection, through an icon 14 selection, though a context menu selection, or automatically via algorithms or through associated metadata. A context menu selection is a pop-up menu that is displayed when the user selects a particular table in the tables and relations window 22 and then "right clicks" using the pointing device. In any case, a user selects two columns that will take part in the relationship, and the Tool 10 then displays a graphical line 34A, 34B, 34C, 34D that connects the selected columns.

In the example shown in FIG. 1, a user has selected three tables, EMPLOYEE, CUSTOMER, and ORDERS. The tables are displayed left-to-right in the order in which they were selected by the user. Thus, EMPLOYEE was selected first, CUSTOMER second, and ORDERS third. The user has then created four illustrative relationships between the three tables. Each of these relationships is depicted by a line 34A, 34B, 34C, 34D, which connects the relevant columns in each table. Thus, relationship 34A is between column empcity of table EMPLOYEE and column custcity of table CUSTOMER, relationship 34B is between column empname of table EMPLOYEE and column custname of table CUSTOMER, relationship 34C is between column custnum of table CUSTOMER and column ordernum of table ORDERS, and relationship 34D is between custcity of table CUSTOMER and column shipto of table ORDERS.

Having established these relationships between the tables, the user must then configure the type of join that will operate on the rows in each table. As described above, in presently known interfaces for configuring joins between tables in a relational database, a user would typically select one of the relationships 34A, 34B, 34C, 34D, and then set the join type between the two tables based on the selected relationship. This would be accomplished by "clicking" on the relationship line and then either opening a context window or making a menu bar or icon bar selection that would allow the user to input the join type. This methodology, however, creates an ambiguous situation with respect to interpreting the non-selected relationship(s).

For example, the user could select the relationship 34B and set the join type to a left outer join. The ambiguity now created is how to interpret the other relationship 34A, either as a separate inner join or as an AND condition to the relationship 34B. If the other relationship 34A is a separate inner join, then the following SQL would be generated by the SQL Query Tool 10 for the first two tables:

SELECT*FROM EMPLOYEE LEFT JOIN CUSTOMER ON
EMPLOYEE.empname=CUSTOMER.custname INNER JOIN CUSTOMER as CUSTOMER1 ON EMPLOYEE.empcity=CUSTOMER1.custcity In this SQL, an alias table, CUSTOMER1, was generated because the relationship 34B is being interpreted as a separate join operation.

But if the software tool 10 interpreted the other relationship 34A is an AND relationship to the selected relationship 34B, then the following SQL would be generated:

SELECT*FROM EMPLOYEE LEFT JOIN CUSTOMER ON
EMPLOYEE.empname=CUSTOMER.custname AND EMPLOYEE.empcity=CUSTOMER1.custcity Thus, allowing the user to set the join type based on one of the join relationships, as is done in presently known query tools, leads to the problem of how to interpret the non-selected relationships, either as AND conditions to the one join that was set, or as additional joins.

Another problem that is not addressed by presently known query tools relates to the ordering or sequencing of the tables 30A, 30B, 30C in the SQL query. In the example shown in FIG. 1, the user selected the tables in the order EMPLOYEE, CUSTOMER, and then ORDERS. Thus, the tables EMPLOYEE and CUSTOMER are joined first and create an intermediate result set that is then joined to the ORDERS table. However, the user may have intended to structure the query so that the CUSTOMER-ORDERS intermediate result set was generated first, and then this result set was joined with the EMPLOYEE table in order to generate the final result set. Presently known query tools do not provide any mechanism for dealing with this problem, other than to start over and build the query again by selecting the tables in their proper order. In addition, the presently known query tools do not provide a mechanism for automatically sequencing the tables in order to generate valid SQL.

Because of these problems, the present invention provides a separate advanced joins viewer (as described in more detail below) that enables the graphical re-sequencing of the table order and thus the reconfiguring of the intermediate result sets that are generated by the query. An automatic sequencing algorithm is also provided for configuring the ordering of the tables so that the query produces valid SQL. The advanced joins viewer also enables the independent configuration of the join type and the join relationships for each of the intermediate result sets, thus solving the ambiguity problem.

Figure 2:
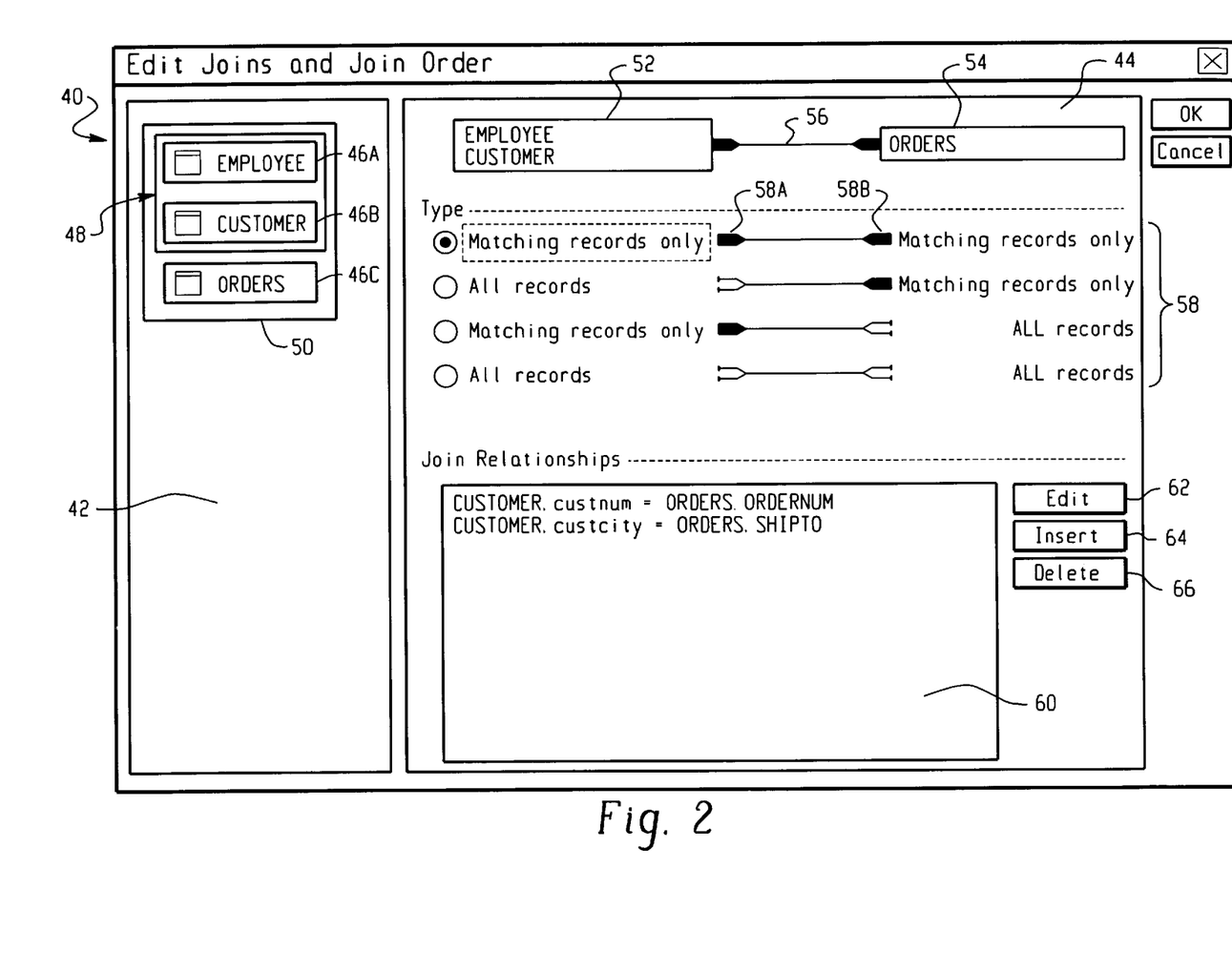
FIG. 2 is a graphical user interface of an advanced joins viewer associated with the SQL Query Tool for configuring, sequencing and viewing joins according to the present invention, showing the join type and join relationships of the tables involved in a join between a table and an intermediate result set formed by two other tables.

FIG. 2 is a graphical user interface of an advanced joins viewer 40 associated with the SQL Query Tool 10 for configuring, sequencing and viewing joins according to the present invention, showing the join type and join relationships of the tables involved in a join between a table and an intermediate result set formed by two other tables. The advanced joins viewer 40 may be activated from the SQL Query Tool interface 10 in several ways, such as by: (1) selecting a text entry from the menu bar 12; (2) selecting the advanced joins viewer icon 16 from the icon bar 14; or (3) selecting a table or relationship in the tables and relations window 22 and then selecting the advanced joins viewer entry from a pop-up context menu. Once selected, the advanced joins viewer 40 interface shown in FIG. 2 is displayed to the user.

The advanced joins viewer 40 includes two primary interface windows, a sequence display window 42, and an intermediate result set join display window 44. The sequence display window 42 displays a sequenced vertical tile list of each table and each associated intermediate result set in a particular query. The vertical tile list is preferably ordered from top to bottom.

Preferably, the table sequence is initially determined automatically using the automatic sequencing algorithm of the present invention, which is described in more detail below with reference to FIGS. 8 and 9. Using this algorithm, the default sequencing is such that each successive table in the vertical tile list has a relationship with one or more prior tables in the list. The intermediate result set join display window 44 displays join information for a particular intermediate result set, including the join type and the join relationships, and also enables the user to set the join type for the intermediate result set independently of the join relationships.

The advanced joins viewer 40 provides several features, including: (1) displays the joined tables in result set order in a vertical tile list; (2) allows users to alter (or re-sequence) the join order by selecting and graphically moving tables to a different location in the vertical tile list; (3) allows users to select a particular intermediate result set from the vertical tile list and then display the details of that result set, including the specific tables that comprise the result set, the join type of the result set, and the join relationships that define the result set; and (4) allows users to set and/or edit the join type and edit the join relationships.

Figure 5:
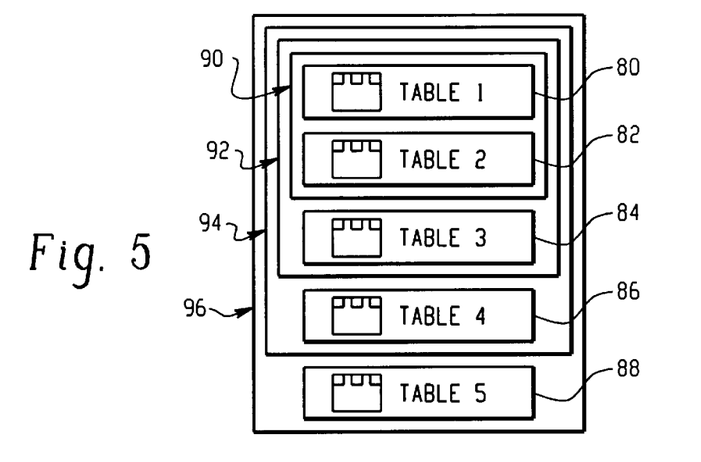
FIG. 5 is a generic depiction of the sequence display window of the advanced joins viewer shown in FIG. 2.

FIG. 5 is a generic depiction of the sequence display window 42 of the advanced joins viewer shown in FIG. 2. In this depiction, the first two tables to be joined are shown as the inner-most tables 80, 82, and the intermediate result set that is generated by joining these first two tables is shown as the box 90 that surrounds the two tables 80, 82. The next table 84 is then joined to the intermediate result set 90 of the first two tables 80, 82, and results in the intermediate result set that is depicted by the box 92. In similar fashion, the next two tables 86, 88 are joined to the intermediate result sets 92, 94, and ultimately generate the result set depicted by box 96.

Although five tables are shown in this generic depiction, the number of tables that are displayed in the sequence display window 42 is only dependant on the number of tables that are selected by the user from the SQL Query Tool 10 interface.

A user can select a particular intermediate result set by "clicking" on one of the tables 80, 82, 84, 86, 88. For example, if the user wanted to display information regarding the intermediate result set 90 that is generated from the join of tables 1 and 2, then the user can select either of these tables using a pointing device. If the user then wanted to display the intermediate result set 92, the user would select the third table 84, and so forth for the other result sets 94, 96.

The information depicted in the intermediate result set join display window 44 depends on which intermediate result set is selected by the user when interacting with the sequence display window 42. Consider, for example, the interface shown in FIG. 2. The tables and relationships depicted in this figure (as well as the remaining figures) correspond to the tables shown in FIG. 1. Here, the sequence display window 42 depicts the ordering of the three tables, EMPLOYEE, CUSTOMER, and ORDERS in a vertical tile list. The innermost tiles in the list 46A, 46B represent the tables EMPLOYEE 46A and CUSTOMER 46B. These two tables are joined into the intermediate result set depicted by the box 48. This intermediate result set 48 is then joined to the ORDERS table 46C, which generates the final result set, which is depicted by the box 50.

In FIG. 2, the ORDERS table 46C has been selected. This selection causes the intermediate result set join display window 44 to display information regarding the result set 50, which results from the join between ORDERS 46C and the intermediate result set 48 that includes the join between EMPLOYEE 46A and CUSTOMER 46B. The intermediate result set join display window 44 preferably includes three elements: (1) a table display 52, 54, 56; (2) a join type display/selection window 58; and (3) a relationships display/ editing window 60. The table display graphically depicts the two sides of the result set join, and also indicates the type of join 56, 58A, 58B.

FIG. 2 shows the intermediate result set 48 (EMPLOYEE joined with CUSTOMER) depicted on one side of the join 52, and the selected table 46C (ORDERS) depicted on the other side of the join 54. Between the two sides of the join is a graphical depiction of the join type. This graphical depiction includes a line 56 that is terminated at either end by a pair of join indicators 58A, 58B.

The join indicators 58A, 58B indicate the type of join that is currently selected for the displayed result set. If the join indicators are both solid, then the join is an inner join. If the left join indicator is empty but the right join indicator is solid, then the join is a left outerjoin. If the left join indicator is solid but the right join indicator is empty, then the join is a right outer join. And if both join indicators are empty, then the join is a full outer join. The join shown in FIG. 2 is an inner join.

The join type display/selection window 58 displays the currently selected join type for the selected result set, and also enables the user to select a different join type. This join type selection step is independent from any of the join relationships shown in the relationships window 60, and thus avoids the join ambiguity problem noted above. The four types of joins, inner, left outer, right outer, and full outer are shown as textual and graphical depictions in the join type display selection window 58.

The top selection in the window 58 is for an inner join, which only returns matching rows from both sides of the join to the result table. The inner join is graphically depicted by a line terminated at both ends with a solid join indicator 58A, 58B. The next selection down from the inner join is the left outer join, which return's all of the rows from the preserved table (in this case the intermediate result set formed by the join between the EMPLOYEE and CUSTOMER tables) and only the matching rows from the non-preserved table (ORDERS). The left outer join is graphically depicted by a line terminated at the left side with an empty join indicator and at the right side with a solid join indicator. The next selection down from the left outer join is the right outer join. The right outer join returns all of the rows from the preserved table (in this case the ORDERS table) and only the matching rows from the non-preserved table (in this case the intermediate result set formed by the join between the EMPLOYEE and CUSTOMER tables.) The right outer join is graphically depicted by a line terminated at the left side with a solid join indicator and at the right side with an empty join indicator. The final selection shown in the window 58 is the full outer join, which is a combination of the left and right outer joins. The full outer join is graphically depicted by a line terminated on both sides with empty join indicators. Although the preferred embodiment of the invention utilizes the inner join and these three types of outer joins, it should be understood that any other types of joins could also be utilized with the invention.

Each of the four join types shown in the join type display/selection window 58 includes a selector button, preferably a radio button, for choosing the join type. The user can select one of these selector buttons in order to change the join type for the selected intermediate result set. This join type selection step is independent of any of the join relationships.

The relationships display/editing window 60 shows the current relationships between the ORDERS table 54 on one side of the join and the intermediate result set 48 generated by the join between the EMPLOYEE and CUSTOMERS tables on the other side of the join. These join relationships can be edited 62 or deleted 66, or another join relationship can be added 64 to those that are already displayed through the window 60.

Figure 3:
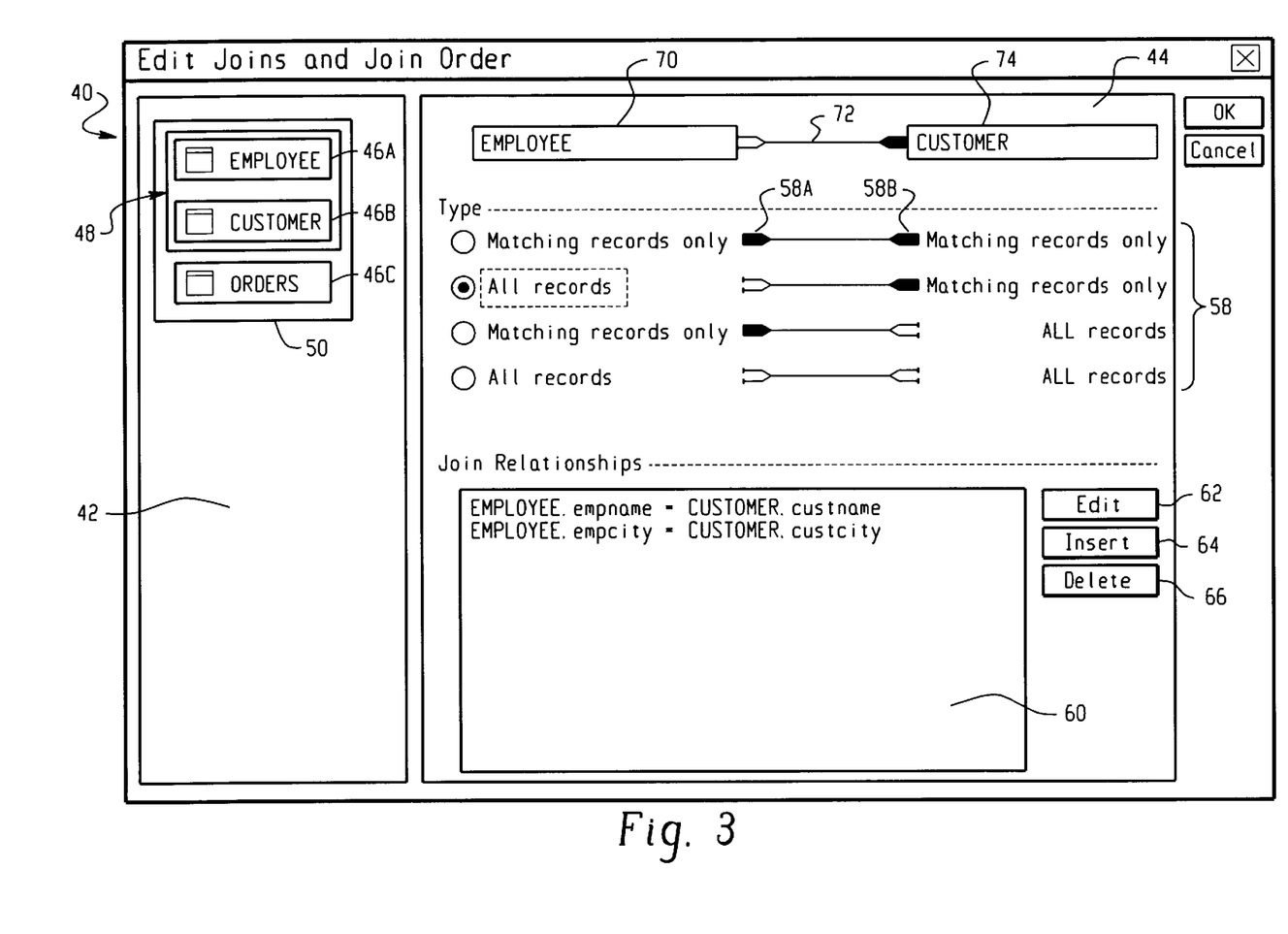
FIG. 3 is another depiction of the advanced joins viewer shown in FIG. 2, showing the join type and join relationships of the tables involved in a join between two tables.

FIG. 3 is another depiction of the advanced joins viewer shown in FIG. 2, showing the join type and join relationships of the tables involved in a join between two tables. In this figure, the user has selected the CUSTOMERS table depiction 46B from the tile list, which then causes the display of the join type and relationships between the CUSTOMERS table and the EMPLOYEE table. Here, the join type is set to a left outer join, and the two relationships are depicted in the relationships display/editing window 60.

Suppose now that the user is not satisfied with the sequencing of the tables shown in the sequence display window 42, and wants to re-order the tables so that the CUSTOMER table is after the EMPLOYEE and ORDERS tables in the sequence. Conventional query tool interfaces do not provide any means for accomplishing this re-ordering step other than by manually re-inputting the entire query.

Figure 4A:
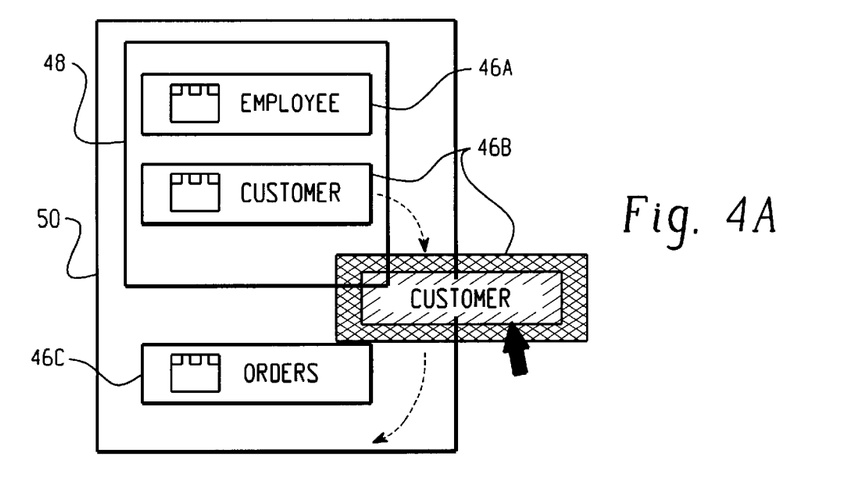
FIG. 4A is a partial depiction of the advanced joins viewer showing the process of manually re-sequencing tables in the query.

FIG. 4A is a partial depiction of the advanced joins viewer showing the process of manually re-sequencing the tables in the query. Here, if the user wants to re-sequence the tables, then the user selects the table to re-sequence by "clicking" on the table with the selection button of a pointing device. Then, while holding down the selection button on the pointing device, the user can drag and drop the selected table to a position in the vertical tile list of the sequence display window 42 that corresponds to the desired ordering. As shown in FIG. 4A, the user has re-sequenced the tables so that the CUSTOMER table 46B is after the ORDERS table 46C by dragging and dropping the CUSTOMER table tile 46B to a position after the ORDERS table tile 46C in the display. Preferably, and as described in more detail below, prior to accepting a new sequence order, the advanced joins viewer 40 will determine if the new sequence is valid, and if not, then it will give the user the option of executing the automatic sequencing algorithm of the present invention in order to ensure a valid SQL query.

Figure 4B:
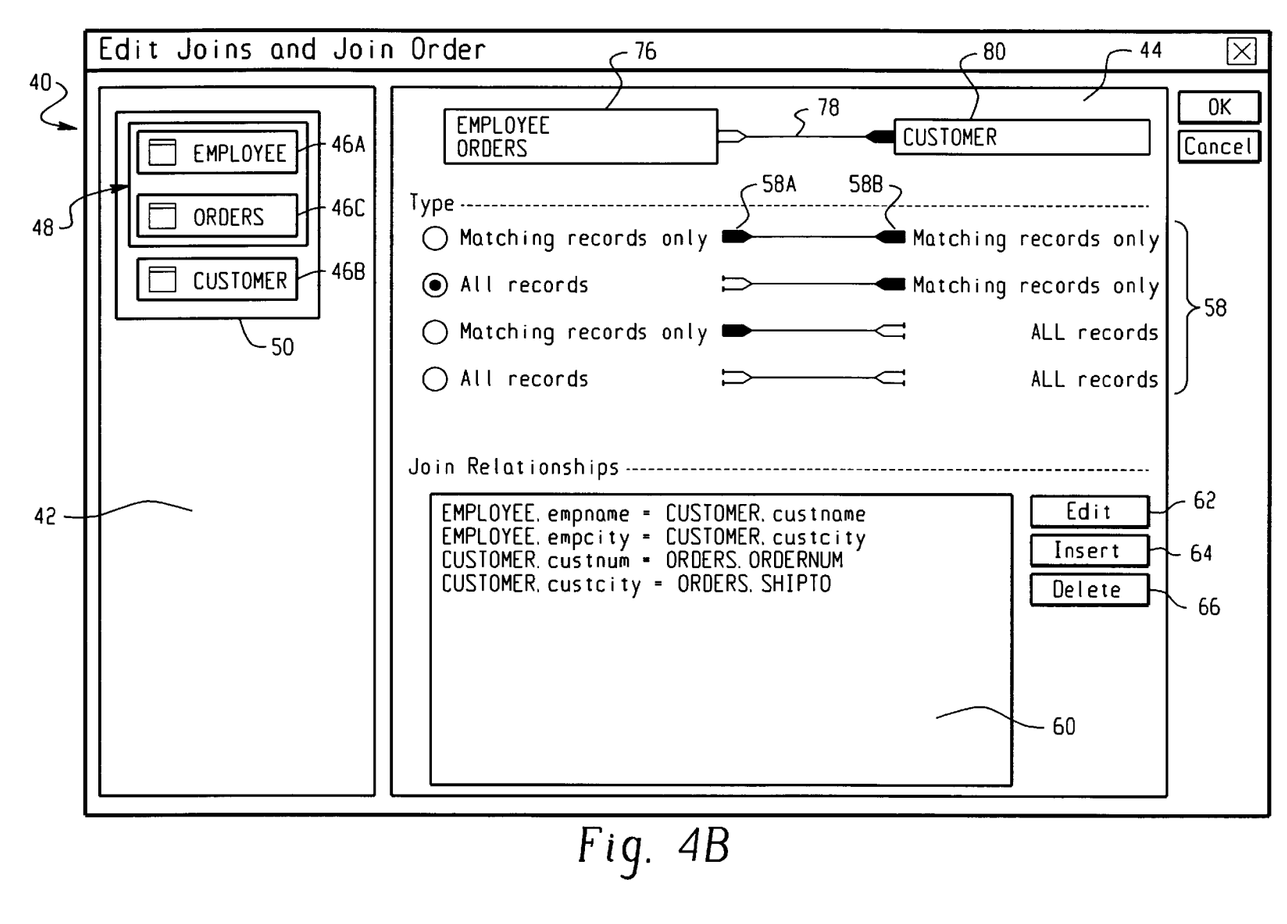
FIG. 4B is another depiction of the advanced joins viewer shown in FIG. 2, in which a new intermediate result set is displayed following the manual re-sequencing of the tables depicted in FIG. 4A.

FIG. 4B is another depiction of the advanced joins viewer shown in FIG. 2 in which a new intermediate result set is displayed following the manual re-sequencing of the tables depicted in FIG. 4A.

Figure 6:
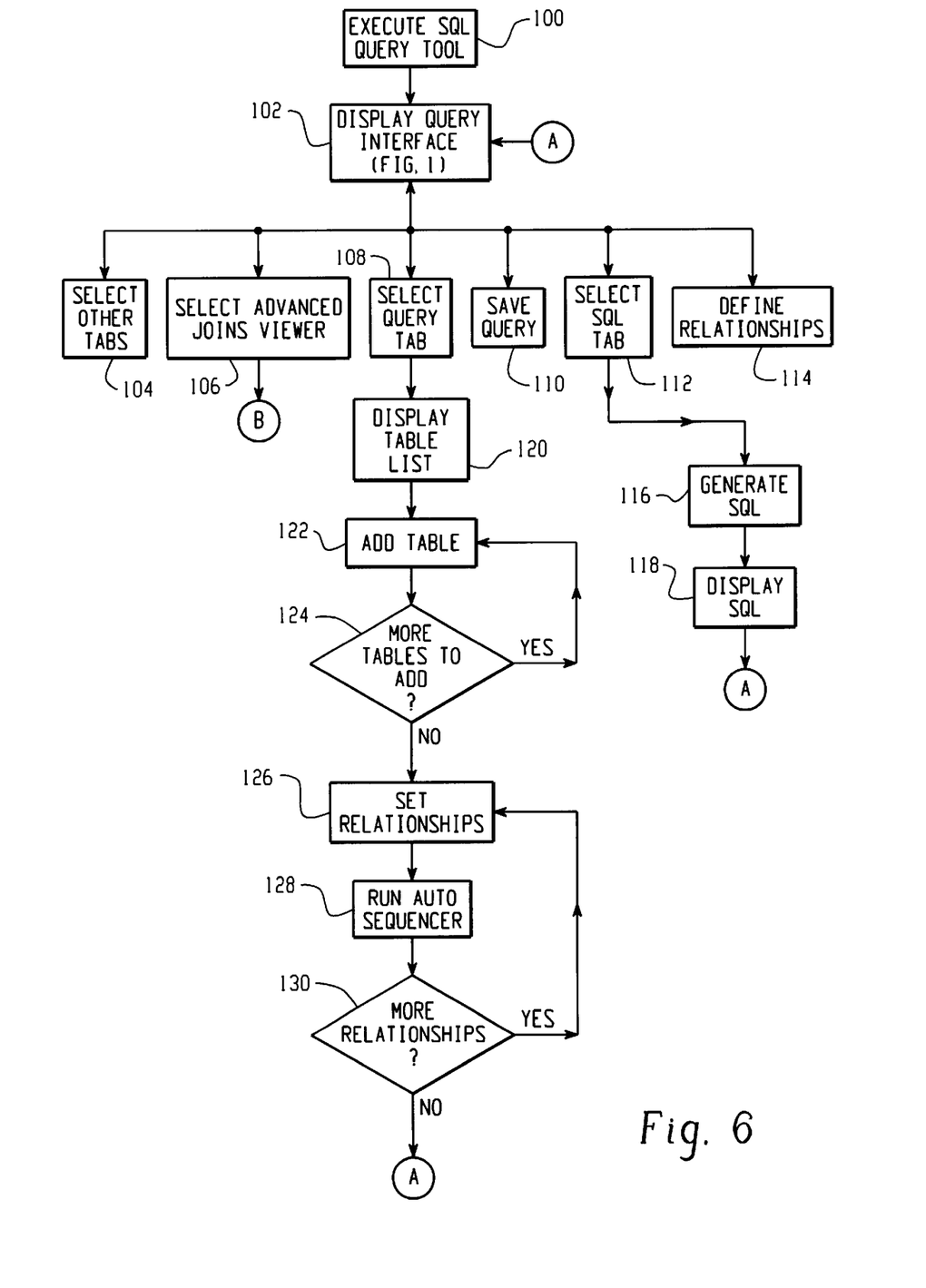
FIG. 6 is a flowchart showing the preferred method of creating and manipulating queries using the SQL Query Tool.

FIG. 6 is a flowchart showing a preferred method of creating and manipulating queries using the SQL Query Tool 10 shown in FIG. 1. The method begins at step 100, where the SQL Query Tool 10 is executed. At step 102, the graphical user interface shown in FIG. 1 is displayed to the user. Several functions are accessible from this interface, including: (1) select query tab (step 108); (2) select advanced joins viewer (step 106); (3) save query (step 110); (4) select SQL tab (step 112); (5) define relationships (step 114); and (6) select other tabs (step 104).

The select query tab 18A shown in FIG. 1 is selected (step 108) in order to create a query. From this interface (FIG. 1), the user can display a list of tables associated with a particular relational database at step 120, and then add one or more tables to the query (step 122). As each table is added to the query, the interface tool 10 preferably depicts an image of the table including the various column variables. If there are more tables to add at step 124, then control loops back to step 122 until the user has selected all of the tables for the particular query. At step 126, the user then sets the column relationships between the selected tables. After a column relationship is set, the method preferably executes the auto sequencing algorithm at step 128 (described in more detail below with reference to FIGS. 8 and 9). If the user desires to set more column relationships at step 130, then control reverts to steps 126 and 128 until all of the column relationships for the query are set, and, preferably, the tables have been sequenced in their proper order using the auto sequencing algorithm.

Step 106 (select advanced joins viewer) is typically selected by a user after (or during) the process shown in steps 108–130. Once selected, the steps shown in FIG. 7 are preferably executed for configuring, sequencing and viewing the join relationships between the selected tables.

At step 110, the user can save a query for later use or modification. At step 114, the user can define (or re-define) one or more of the relationships that are set in step 126. At steps 112–118, the user can generate and display the textual SQL statement associated with the query that is graphically constructed using the select query tab 18A and the advanced joins viewer 40. And at step 104 the user can select various other tabs of the graphical user interface shown in FIG. 1 in order to execute the other SQL functions described above.

Figure 7:
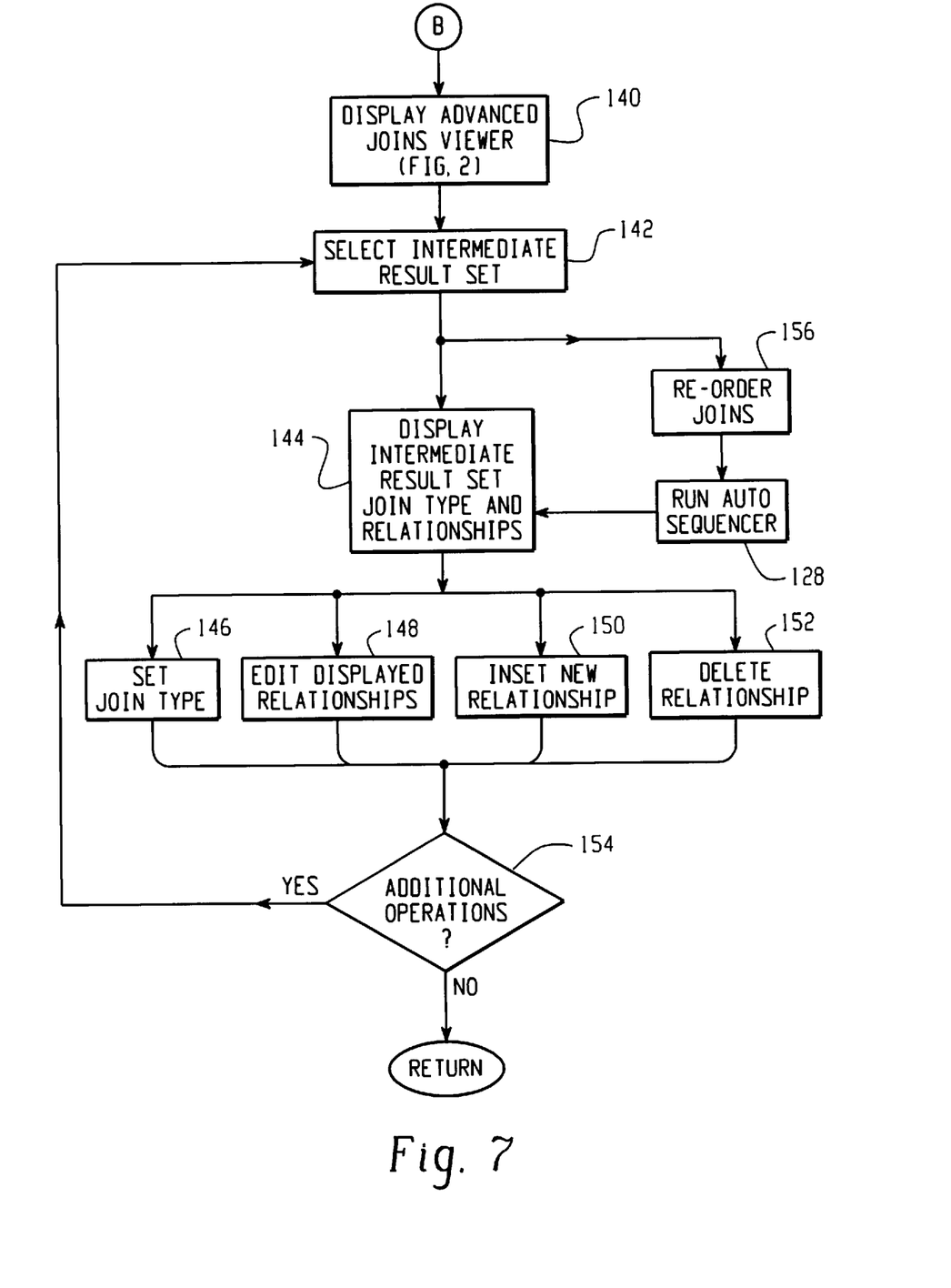
FIG. 7 is a flowchart showing the preferred method of configuring, sequencing and displaying joins using the advanced joins viewer of the present invention.

FIG. 7 is a flowchart showing the preferred method of configuring, sequencing and displaying joins using the advanced joins viewer of the present invention. At step 140, the advanced joins viewer graphical interface shown in FIG. 2, for example, is displayed to the user. As described above, the advanced joins viewer interface includes a sequence display window 42, and an intermediate result set join display window 44. The sequence display window 42 sets forth a sequenced vertical tile list of the tables and the intermediate results sets that form the query. The intermediate result set join display window 44 includes a table display, a join type display/editing window, and a relationships display/editing window. Using the intermediate result set join display window 44, the user can readily appreciate the relationships and ordering between and among the tables that generate a particular intermediate result set, and the user can set the join type independently of any of the individual relationships.

At step 142, the user selects a particular intermediate result set by selecting one of the table tiles displayed in the sequence display window 42. From here, the user may re-order the sequence in which tables are joined (step 156) by graphically moving a particular tile to another position in the vertical tile list. Preferably, after the user has re-sequenced the tables, the method checks to determine if the new sequence will generate a valid SQL statement, and if the new sequence does not generate valid SQL, then the method prompts the user to execute the automatic sequencing algorithm at step 128, which then re-sequences the tables in order to generate valid SQL.

At step 144, the advanced joins viewer 40 displays the intermediate result set and the join type and join relationships in the intermediate result set join display window 44. From this step, the user can then set the join type (step 146), which is done independently of any of the join relationships, the user can edit the displayed relationships (step 148), the user can insert a new relationship (step 150), or the user can delete one of the relationships (step 152). If there are more operations to execute on this particular query, then control passes from step 154 back to step 142, where the user can continue to operate on the currently selected intermediate result set, or the user can select another result set.

Figure 8:
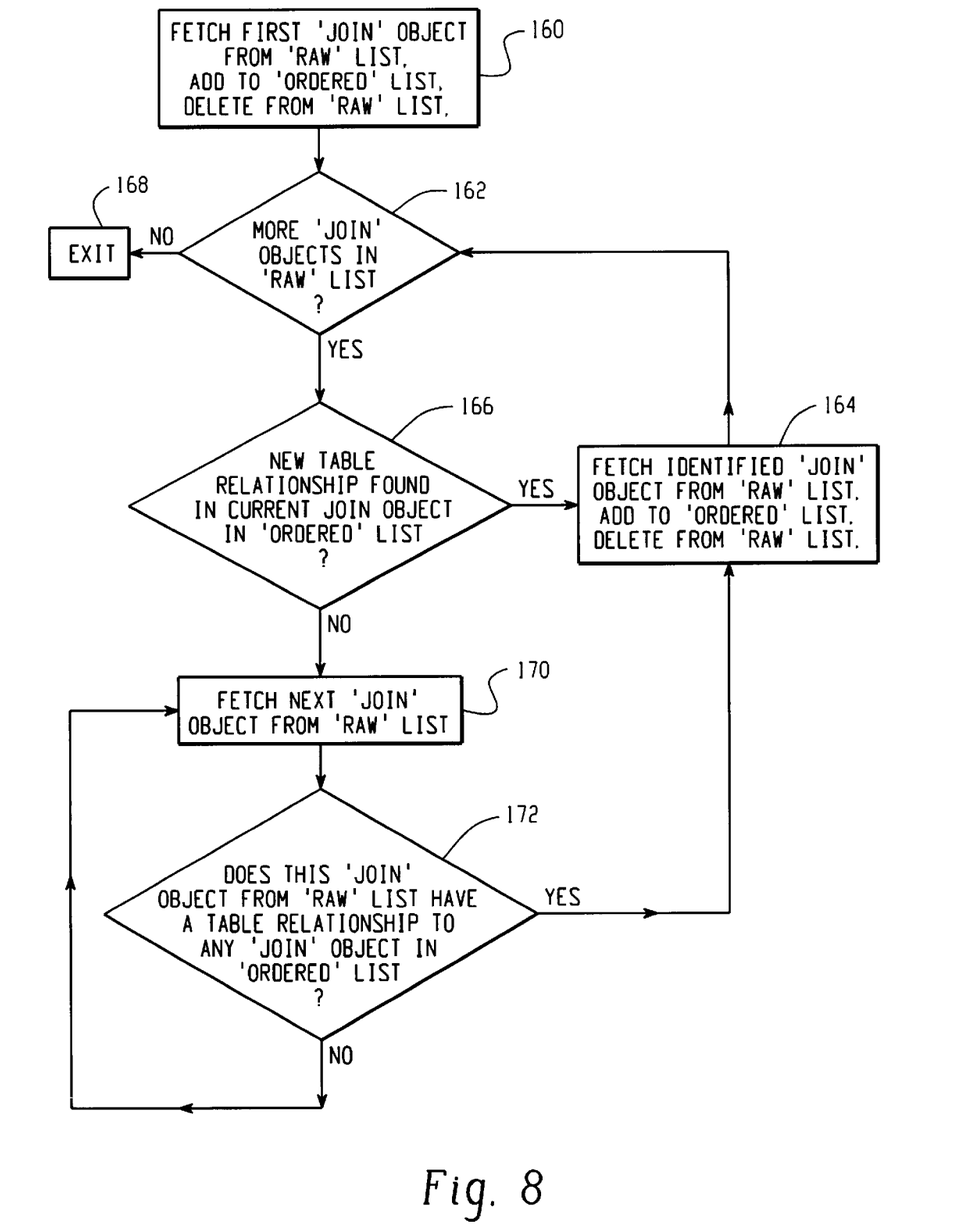
FIG. 8 is a flowchart showing the preferred method of automatically sequencing the tables in the query.
Figure 9:
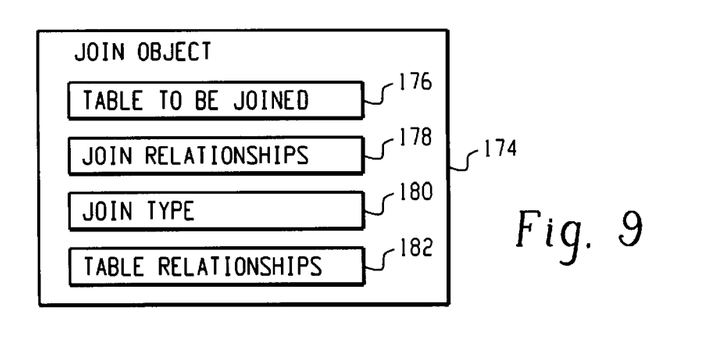
FIG. 9 is a preferred join object for use with the automatic sequencing method described in FIG. 8.

FIG. 8 is a flowchart showing the preferred method of automatically sequencing tables in the query. For each table that participates in a join, the method of the present invention preferably stores a join object. The join object is a collection of information about each table in the join, and, as shown in FIG. 9, the join object preferably includes: (i) the table to be joined (176); (ii) one or more join relationships (178); (iii) the join type (180); and (iv) the table relationships (182).

The join relationships (178) represent the column-specific criteria that are set forth in the ON clause for determining what rows should be returned into the intermediate result set. The table relationships (182) represent a list of tables that have join relationships with the table represented by the join object. And the join type (180) is either an inner join, or one of the three types of outer join (Left, Right, or Full). The default join type is inner, which can be changed in the advanced join viewer 40, as shown and described above.

Preferably, there are two contexts in which the automatic sequencing algorithm described in FIG. 8 is executed. The first context is when a user adds (or deletes) a table to the query. The reason that the automatic sequencer is executed in this context is that the order of the joins in SQL syntax should be specified such that each successive table in the join has a relationship with a table that has already been specified in the generated SQL.

For example, consider a query involving three tables, CUSTOMERS, ORDERS and EMPLOYEE. The CUSTOMERS table has a relationship with the ORDERS table, and the ORDERS table has a relationship with the EMPLOYEE table. Now suppose that a user added the tables in the order CUSTOMERS, EMPLOYEE, and ORDERS. The join objects will be added in the order that the user specified the three tables. However, because EMPLOYEE does not have any relationships with CUSTOMERS, the order of the tables must be altered so that EMPLOYEE follows a table with which it has a relationship.

The automatic sequencing algorithm shown in FIG. 8 ensures that the tables are properly ordered using the rule that each successive table in the join should have a relationship with a table that has already been specified. Thus, each time a relationship line is added between the tables in a query, the sequencer is preferably executed in order to create a default ordering that generates valid SQL. When the advanced joins viewer is invoked, the default ordering is displayed in the sequence display window 42.

The other context in which the automatic sequencing algorithm is executed is within the advanced joins viewer 40 when the user has manually re-sequenced the tables, but the resulting sequence does not generate valid SQL. Here, if a user dragged and dropped a table to a new location in the vertical tile list in the sequence display window 42 such that one or more of the intermediate result sets no longer had any relationships, then query tool software would alert the user to the error and prompt the user to execute the sequencer. If the user responds affirmatively, then the automatic sequencer is executed, thus restoring a correct order. Otherwise the user must re-order (drag and drop) the tables until a valid result set ordering is achieved.

Turning back to FIG. 8, the preferred automatic sequencing algorithm is set forth. The algorithm maintains two lists of join objects. One list is the input "raw" list, which reflects the order in which the tables were selected and displayed in the SQL Query Tool 10, or which were the result of the last automatic (or manual) ordering from interactions with the sequence display window 42. The other list is the final "ordered" list that produces valid SQL syntax. As the algorithm is traversed, tables are populated into the "ordered" list and deleted from the "raw" list. After each table is analyzed accordingly, and moved into the "ordered" list, the "ordered" list is then written into the "raw" list, resulting in a properly-sequenced listing of the tables. In each join object, one of the items that is stored is the list of all tables that have a relationship to the current table, referred to as the table relationship list 182. Thus, by definition, any join object whose table matches one of the tables in the current join object's table relationship list 182 will produce valid SQL syntax when it becomes the next join object in the ordered list.

The preferred sequencing algorithm begins at step 160, where the first join object contained in the "raw" list is fetched and stored in the "ordered" list, and it is then deleted from the "raw" list. Step 162 determines if there are more join objects in the "raw" list. If there are none, then the sequencing algorithm is done, and the process exits at 168. If, however, there are more objects in the "raw" list, then control passes to step 166.

At step 166, the algorithm examines the table relationship entry 182 for the current join object that was fetched in step 160 or 170. If a new table relationship is found in the table relationship entry 182 for this join object, then control passes to step 164. A new table relationship is a table that has not already been added to the "ordered" list. At step 164, the algorithm then fetches the join object for the new table relationship from the "raw" list, adds that join object to the "ordered" list, and deletes it from the "raw" list. Control passes back to steps 162, 164 and 166, which are repeated until a join object is encountered with no new table relationship entries.

At this point, control passes to step 170, where the next join object is fetched from the "raw" list. Step 172 determines whether the join object fetched in step 170 has a table relationship to any join object that is already on the "ordered" list. If so, then control passes to step 164, and the join object from step 170 is added to the "ordered" list and deleted from the "raw" list. If, however, the join object fetched in step 170 does not have any table relationships, then control passes back to step 170 and the next join object is fetched for analysis. These steps 162–172 are repeated until all of the join objects have been moved from the "raw" list to the "ordered" list, at which point the sequencing is complete, and the "ordered" list is written back as the "raw" list, but now in proper table sequence.

The preferred embodiment described with reference to the drawing figures is presented only to demonstrate an example of the invention. Additional, and/or alternative, embodiments of the invention would be apparent to one of ordinary skill in the art upon reading this disclosure.

What is claimed:

1. A system for configuring, sequencing and displaying joins in a query, comprising:

a sequence display window for depicting the sequence in which a plurality of tables are joined in the query, and for selecting an intermediate result set comprising two or more of the depicted tables; and a join configuration and display window for displaying the selected intermediate result set, including a table display for depicting the tables associated with the intermediate result set, a join type selector for configuring the type of join for the intermediate result set, and a relationships display window for depicting one or more relationships between the tables in the intermediate result set;

wherein the join type selector selects from a list of join types, wherein the list of join types comprises an inner join type and an outer join type;

wherein the tables include columns, wherein the columns of two different tables are capable of having a join relationship between the columns;

wherein the join type selector configures a join type two of the tables independently of a join relationship involving the tables' columns.

2. The system of claim 1, further comprising:

an automated sequencing algorithm that reconfigures the sequence of the plurality of tables so that the resulting query is valid.

3. The system of claim 2, further comprising a plurality of join objects for each of the plurality of tables in the query, wherein each join object for a given table includes:

an identification of the table;

one or more join relationships that define the criteria for joining the table to other tables;

an indication of the type of join for the table; and a table relationships list that indicates what other tables are related to the table.

4. The system of claim 1, wherein the sequence display window depicts the plurality of tables as a vertical tile list, wherein each tile in the list corresponds to a table.

5. The system of claim 4, wherein the vertical tile list is sequenced from top to bottom.

6. The system of claim 1, wherein the join type selector includes a plurality of radio buttons, each radio button being associated with a type of join.

7. The system of claim 6, wherein the type of join includes an inner join and one or more types of outer joins.

8. The system of claim 1, wherein the table display further comprises a join type indicator that links the tables in the intermediate result set, wherein the join type indicator graphically depicts the type of join for the selected intermediate result set.

9. A software tool for creating SQL queries involving tables, wherein the tables include columns, wherein the columns of two different tables are capable of having relationships between the columns, comprising:

a graphical user interface for selecting at least three tables and for defining relationships between the three tables; and an advanced joins viewer for depicting one or more intermediate result sets comprising two or more of the selected tables, and for configuring the join types between the tables independently of any defined relationships;

wherein the join type is an inner join type or an outer join type;

wherein the advanced joins viewer is operable to configure a join type between two of the tables such that the configured join type is independent of a relationship involving the tables' columns and is capable resolving an ambiguity that is capable of arising due to a relationship involving the table's columns.

10. The software tool of claim 9, wherein the advanced joins viewer includes:

a sequence display window for graphical depicting the order of the tables and the intermediate results sets that form the query; and an intermediate result set join display window for selecting the join type of an intermediate result set independent from any of the defined relationships;

wherein the ambiguity is capable of arising due to a join type not being established for a relationship between columns from two tables.

11. The software tool of claim 10, wherein the intermediate result set join display window includes a table display that displays the tables associated with a selected intermediate result set, a join setting window for selecting a join type for the selected intermediate result set, and a relationships window for displaying the column relationships between the tables in the intermediate result set.

12. The software tool of claim 10, further comprising:

means for graphically re-sequencing the tables in the query.

13. The software tool of claim 12, further comprising:

means for determining whether the re-sequenced query will generate valid query syntax; and if the re-sequenced query will not generate valid query syntax, then automatically re-sequencing the order of the tables so as to generate valid query syntax.

14. A method of configuring joins in an SQL query involving tables wherein the tables include columns, wherein the columns of two different tables are capable of having relationships between the columns, comprising the steps of:

adding two or more tables to the query;

setting column relationships between the two or more tables;

selecting an intermediate result set from the two or more tables added to the query;

displaying the join type and column relationships for the selected intermediate result set; and configuring the join type for the intermediate result set independently of the column relationships;

wherein the join type is an innerjoin type or an outer join type;

wherein the configured join type exists between two of the tables such that the configured join type is independent of a relationship involving, the tables' columns and is capable of resolving an ambiguity that is capable of arising, due to a relationship involving the table's columns.

15. The method of claim 14, further comprising the step of:

automatically sequencing the two or more tables each time a column relationship is set.

16. The method of claim 14, further comprising the step of:

displaying the order in which the two or more tables are joined in the query using a vertical tile list.

17. The method of claim 16, further comprising the step of:

manually re-sequencing the two or more tables by graphically selecting one of the displayed tables and moving it to another location in the vertical tile list.

18. The method of claim 17, further comprising the steps of:

determining whether the re-sequenced tables will generate valid SQL, and if not, then automatically re-sequencing the tables so to generate valid SQL.

19. A method of configuring joins in a database management system, comprising the steps of:

selecting a plurality of tables from a relational database;

setting a plurality of relationships between the plurality of tables;

wherein the relationships set between the plurality of tables are join relationships between columnns of the tables;

displaying a sequenced listing of the selected tables;

selecting an intermediate result set comprising two or more of the selected tables;

displaying a plurality of join types for the intermediate result set; and selecting a join type for the intermediate result set independently from the plurality of relationships;

wherein the join type for the intermediate result set is selected independently of a join relationship involving the tables' columns;

wherein the selected join type is an innerjoin type or an outer join type.

20. A method of automatically sequencing tables joined in an SQL query, comprising the steps of:

(a) providing a join object for each table, wherein the join object includes a table relationships list that sets forth related tables;

(b) providing a first list of the tables in the SQL query;

(c) moving a first table from the first list into a second list and deleting the first table from the first list;

(d) determining whether the first table has a related table in its table relationships list, and, if so, then moving the related table from the first list to the second list and deleting the related table from the first list;

(e) repeating step (d) until a selected table has no related table in its table relationships list;

(f) fetching a second table from the first list;

(g) determining whether the second table has a related table in its table relationships list that has been moved to the second list, and, if so, then moving the related table from the first list to the second list and deleting the related table from the first list; and (h) repeating steps (d) through (g) until there are no tables remaining in the first list.

21. A computer-implemented process for sequencing and configuring joins in an SQL query, comprising the steps of:

graphically building an SQL query having a plurality of tables, wherein the tables are related by a plurality of table relationships;

wherein the relationships set between the plurality of tables are join relationships between columns of the tables;

automatically sequencing the tables in order to generate a valid SQL query;

graphically depicting the sequencing of the tables as a plurality of intermediate result sets;

selecting one of the intermediate result sets; and configuring the join type for the selected intermediate result set independently from the join relationships between the columns of the tables, wherein the configured join type is an inner join type or an outer join type.

22. A method of visually depicting and modifying the sequence of joins in a query, comprising the steps of:

generating a sequence display window comprising a plurality of tiles, wherein each tile corresponds to a table in the query that is joined to some other table;

ordering the tiles in a particular sequence;

selecting one of the tiles to be re-ordered in the sequence;

graphically moving the selected tile from a first position in the sequence to a second position in the sequence; and re-ordering the tiles so that the selected tile is depicted in the second position in the sequence.

23. A method for configuring, sequencing and displaying joins in a query involving tables, wherein the tables include columns, wherein the columns of two different tables are capable of having join relationships between the columns, comprising the steps of:

(a) displaying a sequence display window for depicting the sequence in which a plurality of tables are joined in the query, and for selecting an intermediate result set comprising two or more of the depicted tables; and (b) displaying through a join configuration and display window the selected intermediate result set, including a table display for depicting the tables associated with the intermediate result set, a join type selector for configuring the type of join for the intermediate result set, and a relationships display window for depicting one or more relationships between the tables in the intermediate result set, wherein step (a) is performed prior to step (b), wherein the join type selector selects from a list of join types, wherein the list comprises at least two of the following join types; an inner join type, a left outer join type, a right outer join type, and a full outer join type;

wherein the join configuration and display window configures join types between the tables independently of relationships between the tables such that the join configuration and display window is operable to configure a join type independent of a relationship involving the tables' columns.

24. The method of claim 23, further comprising the step of:

using an automated sequencing algorithm that reconfigures the sequence of the plurality of tables so that the resulting query is valid.

* * * * *

UNITED STATES PATENT AND TRADEMARK OFFICE
CERTIFICATE OF CORRECTION

PATENT NO. : 6,640,221 B1
DATED : October 28, 2003
INVENTOR(S) : Levine et al.

It is certified that error appears in the above-identified patent and that said Letters Patent is hereby corrected as shown below:

Column 14,
Line 36, insert -- between -- before "two".

Column 15,
Line 64, delete "innerjoin" and insert -- inner join --.

Column 16,
Line 1, delete "involving," and insert -- involving --.
Line 4, delete "arising," and insert -- arising --.
Line 30, delete "columnns" and insert -- columns --.
Line 43, delete "innerjoin" and insert -- inner join --.

Column 18,
Line 19, delete "types;" and insert -- types: --.

Signed and Sealed this

Twenty-third Day of December, 2003

JAMES E. ROGAN
*Director of the United States Patent and Trademark Office*